June 9, 1959 A. LEMPICKI 2,890,350
IMAGE CONVERTER
Filed Sept. 28, 1956
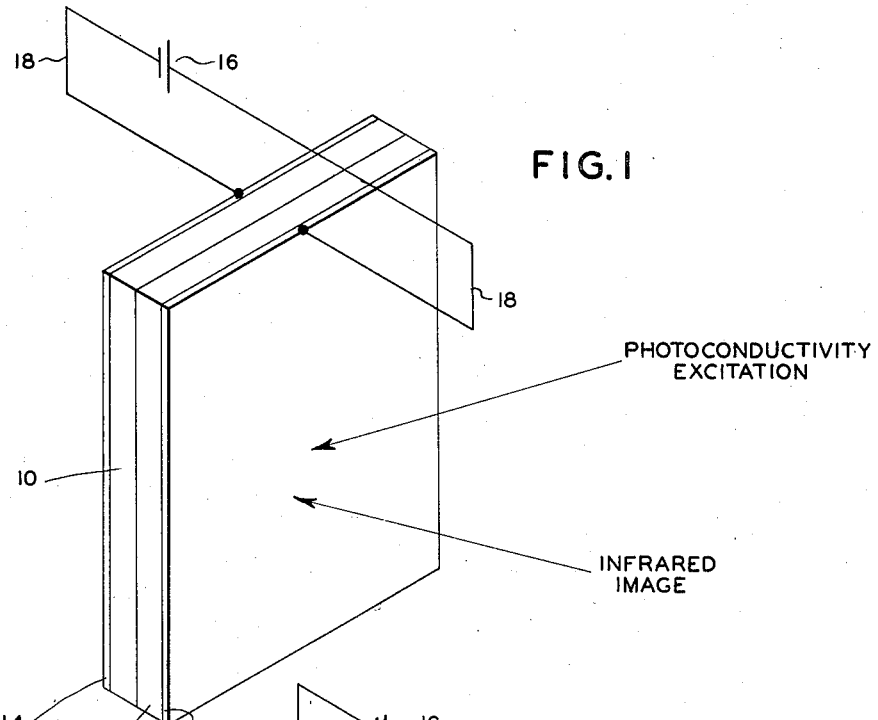
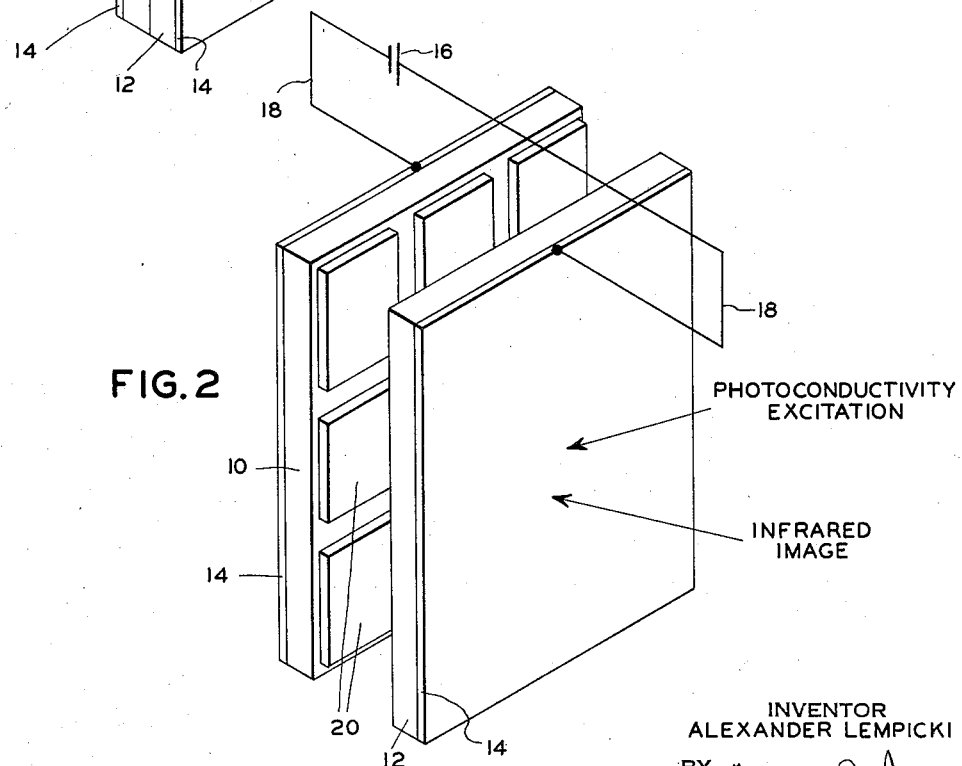
INVENTOR
ALEXANDER LEMPICKI
BY
ATTORNEY

2,890,350

IMAGE CONVERTER

Alexander Lempicki, Forest Hills, N.Y., assignor to Sylvania Electric Products Inc., a corporation of Massachusetts Application September 28, 1956, Serial No. 612,745

4 Claims. (Cl. 250—213)

My invention relates to infrared image converters.

It is an object of the present invention to convert an infrared image into the negative of a visible image, the negative being employed on an illuminated background.

Another object is to provide a new and improved infrared image converter for transforming an infrared image into the negative of a visible image as displayed on an illuminated background.

Yet another object is to convert infrared images to visible images.

Still another object is to improve infrared image converters through the use of infrared photoconductive quenching.

These and other objects of my invention will either be explained or will become apparent hereinafter.

Certain photoconductors, such as zinc sulphide or cadmium sulphide, when illuminated by incident light of suitable wavelength, will exhibit a sharply reduced electrical resistance. If an illuminated photoconductor of this type is simultaneously exposed to infrared radiation, the resistance of the photoconductor will increase toward its original value. This phenomenon is known as infrared photoconductive quenching.

Certain types of phosphors, when placed in an electric field, will luminesce, the intensity of the emitted light being some function of the strength of this applied field. Consequently, films or layers containing such phosphors can be used to transform electrical energy to light energy. Phosphors of this type are said to be electroluminescent.

In accordance with the principles of the invention, an electroluminescent second layer is applied over a first layer formed from photoconductive material susceptible to infrared photoconductive quenching. First and second transparent electrically conductive films are respectively applied over the corresponding surfaces of the first and second layers which are remote from the first layer-second layer interface. A voltage is applied between the two films.

The electrical characteristics of the two layers are such that the dark (not illuminated) resistance of the first layer is high relative to the resistance of the second layer. However, when the first layer is illuminated, its resistance decreases and becomes low relative to the resistance of the second layer.

As a result, when the first layer is not photoconductively excited, most of the potential drop produced across both layers appears across the first layer and the second layer does not luminesce appreciably. When the first layer is excited, most of the potential drop appears across the second layer; it luminesces and glows uniformly.

While the first layer is excited in this fashion, I selectively illuminate the first layer with infrared radiation to form an infrared image thereon. Photoconductive quenching ensues, and the resistance of the regions of the first layer irradiated by the image sharply increases. The corresponding regions of the second layer become darker because the potential drop thereacross decreases. Consequently, the negative of the infrared image is displayed against an illuminated background on the second layer.

Certain substances exhibit both photoconductive and electroluminescent properties. When an electroluminescent layer composed of a substance of this type is to be used in the manner described above, it is necessary to prevent any light incident upon the photoconductive layer from penetrating therethrough and into the electroluminescent layer; otherwise the resistance of the electroluminescent layer will change due to its photoconductivity. A third layer formed from light-opaque, electrically conductive material can be interposed between the photoconductive and electroluminescent layers to prevent such penetration. This layer is in the form of a matrix wherein adjacent sections of the light-opaque electrically conductive material are electrically insulated from each other to prevent short circuiting of the photoconductive layer.

Illustrative embodiments of my invention will now be described with reference to the accompanying drawing, wherein:

Fig. 1 shows an infrared converter utilizing electroluminescent and photoconductive layers having a common interface; and Fig. 2 shows a modification of the converter of Fig. 1 in which the electroluminescent and photoconductive layers are separated by an intervening layer.

Referring now to Fig. 1, there is shown a sandwich-like structure comprising in the order named, a transparent electrically conductive first film 14, formed for example of stannous chloride; an electroluminescent layer 10 formed for example of zinc sulphide; a photoconductive layer 12 formed for example of cadmium sulphide; and a transparent electrically conductive second film 14 identical in composition to the first film.

A voltage yielded by battery 16 is applied through the leads 18 across films 10 and 14; the photoconductive layer is illuminated by incident light, and the electroluminescent layer 10 is caused to luminesce uniformly in the manner indicated previously. Infrared radiation is selectively directed upon the photoconductive layer 12 and forms an image thereon which is displayed as a negative on the electroluminescent layer.

Fig. 2 shows a modification of the converter of Fig. 1 in which a matrix of insulatedly separated small squares 20 of light opaque electrically conductive material, as for example aluminum, is interposed between the photoconductive and electroluminescent layers to absorb incident light passing through the photoconductive layer in the manner previously described.

While I have shown and pointed out my invention as applied above, it will be apparent to those skilled in the art that many modifications can be made within the scope and sphere of my invention as defined in the claims which follow.

What is claimed is:

1. In combination, an electroluminescent layer; a photoconductor layer applied over the electroluminescent layer; said photoconductive layer being composed of photoconductive material susceptible to infrared photoconductive quenching; means coupled between said layers to apply a voltage therebetween; means to illuminate said photoconductive layer with incident light; and means to selectively irradiate said photoconductive layer with infrared to form an infrared image thereon, whereby photoconductive quenching ensues and said electroluminescent layer displays the negative of said image against an illuminated background.

2. In combination, an electroluminescent layer; a photoconductor layer applied over the electroluminescent layer, said photoconductive layer being composed of photoconductive material susceptible to infrared photoconductive quenching; a light isolation layer interposed between said photoconductor and electroluminescent layers, said isolation layer comprising a matrix formed from a plurality of insulatedly separated coplanar elements, each element being composed of a light opaque electrically conductive material; means coupled between said layers to apply a voltage therebetween; means to illuminate said photoconductive layer with incident light; and means to selectively irradiate said photoconductive layer with infrared to form an infrared image thereon, whereby photoconductive quenching ensues and said electroluminescent layer displays the negative of said image against an illuminated background.

3. In combination, a first transparent electrically conductive film; an electroluminescent layer applied over the first film; a photoconductor layer applied over the electroluminescent layer; and a second transparent electrically conductive film applied over the photoconductor layer; means coupled between said films to apply a voltage therebetween; means to illuminate said photoconductive layer with incident light; and means to selectively irradiate said photoconductive layer with infrared to form an infrared image thereon, whereby photoconductive quenching ensues and said electroluminescent layer displays the negative of said image against an illuminated background.

4. In combination, a first transparent electrically conductive film; an electroluminescent layer applied over the first film; a light isolation layer applied over the electroluminescent layer, said isolation layer comprising a matrix formed from a plurality of insulatedly separated coplanar elements, each element being composed of a light opaque electrically conductive material; a photoconductor layer applied over the isolation layer; and a second transparent electrically conductive film applied over the photoconductor layer; means coupled between said films to apply a voltage therebetween; means to illuminate said photoconductive layer with incident light; and means to selectively irradiate said photoconductive layer with infrared to form an infrared image thereon, whereby photoconductive quenching ensues and said electroluminescent layer displays the negative of said image against an illuminated background.

References Cited in the file of this patent
UNITED STATES PATENTS 2,818,511    Ullery et al. _____ Dec. 31, 1957

FOREIGN PATENTS 157,101    Australia _____ June 16, 1954

OTHER REFERENCES

Kazan et al.: "An Electroluminescent Light-Amplifying Picture Panel," Proc. of the Inst. of Radio Engineers, December 1955, pages 1888 to 1897.

"Electroluminescence and Related Topics," pp. 1931–1936, Proceedings of the I.R.E., vol. 43, No. 12, December 1955.